May 8, 1934.    H. P. DAHLSTRAND    1,957,700
FLANGE CONNECTION
Filed April 16, 1931

Inventor
H. P. Dahlstrand
by
Attorney

Patented May 8, 1934

1,957,700

UNITED STATES PATENT OFFICE 1,957,700

FLANGE CONNECTION

Hans P. Dahlstrand, Wauwatosa, Wis., assignor to Allis-Chalmers Manufacturing Company, Milwaukee, Wis., a corporation of Delaware Application April 16, 1931, Serial No. 530,451

17 Claims. (Cl. 253—39)

This invention relates in general to the art of detachable connectors for abutting rigid elements and relates more specifically to improvements in the construction of detachable clamps for firmly clamping together abutting casing sections of heat engines.

In order to eliminate large and heavy flanges adjacent the abutting surfaces of engine casing sections it has been proposed to interpose clamping members between the ordinary stud bolts and the abutting flanges, the large and heavy flanges being undesirable especially in engines operating on a fluid at high temperatures and having rotatory parts because of the differential rate of cooling of the flanged parts from the remaining casing portions, tending to cause distortion of the casing with the danger of its being wrecked through contact with a rotating part. One such clamping device is disclosed and claimed in an application filed on April 25, 1930 by the applicant Hans Dahlstrand, Serial No. 447,398. This present application covers an improvement of said clamping device in that in its application to engines having a plurality of pressure,—heat stages, motive fluid thereof may be passed through the hollow clamping stud bolts of the improved device to maintain a temperature in the bolts below that of the adjacent engine walls. The artificial temperature gradient thereby realizable, between the casing walls and clamping bolts may be sufficiently large so as to have a materially reduced maximum temperature for the bolts of the clamping device, which are its tensioned members. The cooling of the bolts effects a very material relative increase in the tensile strength thereof and the creep and stretch thereof which previously accompanied high temperatures will incidentally also be found to be materially decreased.

A more specific object of the invention therefore is to provide a clamping device for high temperature—plural pressure stage engines, having stud bolts of hollow construction as the tensioned elements, with means for circulating a portion of the working fluid of the engine therethrough, derived from a point in said engine where the temperature of the working fluid is materially less than at the inlet to the engine.

Another object of the invention is to provide an improved adjustable clamping device for heat engines that is simple and inexpensive in construction and effective in firmly securing together abutting casing sections of heat engines or the like.

Other objects and advantages of the present invention will be apparent from a consideration of the detailed description hereinafter found in this specification when taken in connection with the accompanying drawing wherein a preferable embodiment of this invention is shown and in which like characters of reference refer to similar parts in all of the several views.

Figure 1:
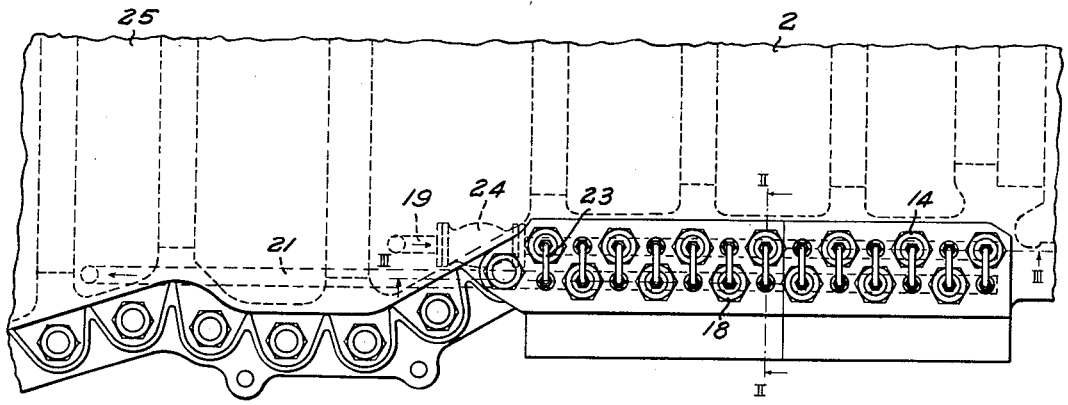
Fig. 1 is a fragmentary plane view of a multipressure stage steam turbine having the improved clamping device associated with the longitudinally flanged sections in a portion thereof, adjacent the high pressure,—high temperature fluid inlet end of the steam turbine.
Figure 2:
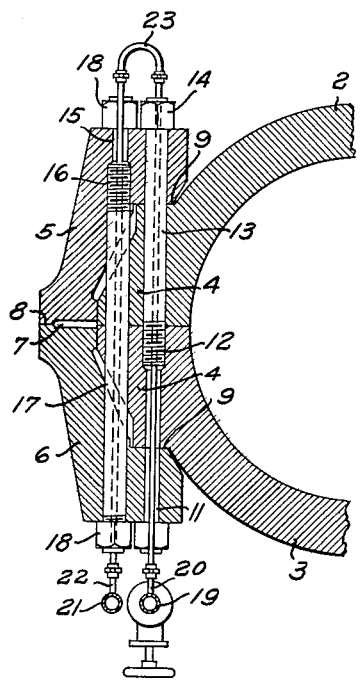
Fig. 2 is a section along line II—II of Fig. 1, looking in the direction of the arrows, and shows a portion of the improved clamping device in transverse cross-section.
Figure 3:
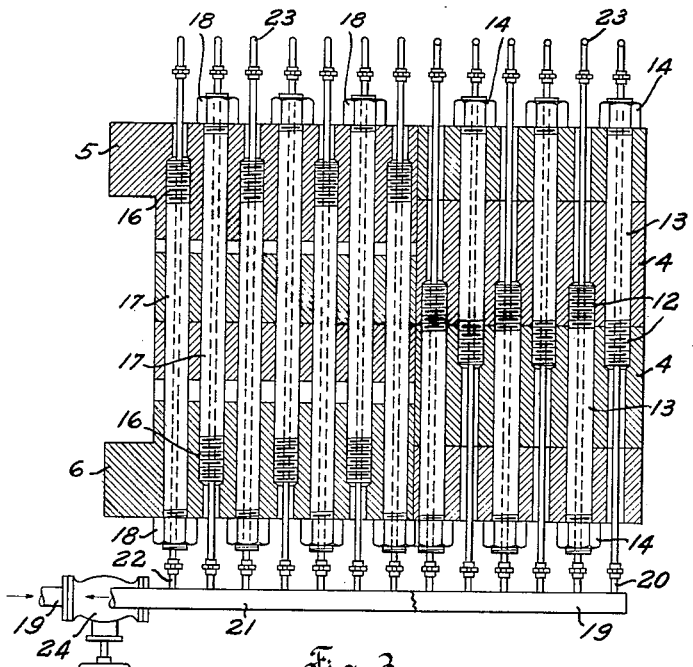
Fig. 3 is a section along broken line III—III of Fig. 1 and shows the cooling pipes located within the hollow stud bolts, in side elevation.

Referring to Fig. 1 wherein the numeral 25 is used to designate the low pressure portion of a heat engine, a steam turbine, having the improved clamping device associated with the flanges in a portion thereof, adjacent the high pressure,—high temperature fluid inlet end, comprising an upper casing section 2 and an abutting lower casing section 3. The flanges 4 in said sections are purposely made light and as small as possible, as shown, to avoid local enlargements thereat and are provided with portions or surfaces 9 which cooperate directly with the corresponding grip portions in a pair of clamping members 5 and 6. The clamping members 5 and 6 are provided with registering cutout portions which define a compression space 7 therebetween when the grip portions of said members and said portions or surfaces 9 are brought into contact as shown in Fig. 2 and which leave but a small contact surface 8 for said members so that the necessary force at the gripping portions to hold the sections 2 and 3 in firm engagement by means about to be described, may be realized.

This means comprises a series of spaced bores 11 extending transversely through the grip portions of clamping members 5 and 6 and through the corresponding portions of flanges 4 in the casing sections 2 and 3. The bores of said series being provided with threaded portions 12 located alternately in the abutting flanges 4 of the casing sections 2 and 3. The threaded portions 12 of the bores cooperate with the similarly threaded portions of the primary clamping stud bolts 13 and the opposite ends of the bolts 13 are threaded to receive the securing nuts 14. Said means further includes a series of parallel bores 15 spaced radially outwardly from the bores 11, and extending through the clamping members 5 and 6 and through the flanges 4 in the casing sections 2 and 3. These bores are similarly provided with threaded portions 16 located alternately in the clamping members 5 and 6 and each of these threaded portions 16 is preferably located in the clamping member other than the one which engages the casing section in which the threaded portion 12 of a radially adjacent bore of the series of bores 11 is located. The threaded portions 16 cooperate with the similarly threaded portions of the secondary clamping stud bolts 17 and the outer ends of the bolts 17 are threaded to receive the securing nuts 18. The clamping arrangement thus far described is substantially the same as disclosed and claimed in the above referred to application of the applicant.

This invention distinguishes therefrom, however, in that the two series of clamping stud bolts 13 and 17 are hollow and therefore must be of larger external diameters than need be those disclosed in said application, for a given casing volume and pressure of operating fluid and number of clamping bolts. The instant stud bolts 13 and 17 are made hollow so that they may receive cooling pipes of sufficient flow volumes, as will now be described.

An inlet header 19 provided with a regulating valve 24 and closed at one end is accordingly associated with the clamping members 5 and 6 and it is provided with a number of branch pipes 20 corresponding to the number of primary clamping stud bolts 13, between the valve 24 and the closed end, within which they are received. The free ends of said branch pipes 20 are secured to the corresponding ends of branch pipes 22, located within the secondary stud bolts 17, by means of U pipes 23. The other ends of the branch pipes 22 are connected into the outlet header pipe 21 which also is closed at one end. The open end of inlet header pipe 19 is connected into the turbine casing at a point of lower fluid temperature than the fluid inlet temperature to said turbine and of lower temperature than the temperature in the sections 2 and 3 as appears in Fig. 1. And the open end of outlet header pipe 21 is connected into the turbine casing at a point where lower fluid pressure exists than at the point of connection to said casing of header pipe 19, as also clearly appears in Fig. 1. In this way a cooling action upon the clamping stud bolts 13 and 17 may be effected by heat interchange between said bolts and the motive fluid of the engine to which the clamping device is applied. It is perfectly obvious that another source of cooling fluid may be provided, one that is independent of the engine to which the clamping device is applied, with the same beneficial results and such an arrangement is to be construed as falling within the purview of this invention.

The above described clamping device has especial utility in steam turbine unit constructions designed for high temperature steam operation, since the relative tensile strength of the stud bolts of the clamping device is materially increased by the novel cooling arrangement located within the hollow stud bolts and the creep and stretch of the bolts which were found to accompany the decrease in tensile strength thereof, due to the high temperatures in the prior art clamping devices are found to be much less.

The disclosed clamping device may also be used to effect a firmer clamping engagement between the sections 2 and 3 of a heat engine, such as disclosed, by elongating the primary and secondary stud bolts 13 and 17, respectively, through heat exchange between the bolts and a high temperature heating fluid passed through pipes 20 and 22. These elongations may readily be taken up as the stud bolts become highly heated, through turning of the cooperating nuts 14 and 18, to effect the said firmer clamping engagement between the casing sections 2 and 3 upon subsequent cooling of the stud bolts as above described.

It should be understood that it is not desired to limit the invention to the exact details of construction and operation herein shown and described, for various modifications within the scope of the claims may occur to persons skilled in the art.

It is claimed and desired to secure by Letters Patent:

1. In a casing, a pair of abutting flanged casing sections, said casing sections being highly heated, a plurality of contacting members engaging said casing section flanges, means for effecting a firm engagement between said members and said flanges, and means for effecting a difference comprising a drop of the temperature of said former means from that of the temperature of the walls of said sections.

2. In a casing, a pair of abutting flanged casing sections, said casing sections being highly heated, a plurality of contacting members engaging said casing section flanges, bolt means for effecting a firm engagement between said members and said flanges, and means for effecting a material difference comprising a material drop of the temperature of said bolt means from that of the temperature of the walls of said sections.

3. In a heat engine employing a relatively high temperature motive fluid, a pair of flanged casing sections, a plurality of contacting members engaging said casing section flanges, means for effecting a firm engagement between said members and said flanges, and means for effecting a difference comprising a drop of the temperature of said former means from that of the temperature of the walls of said sections.

4. In a heat engine employing a relatively high temperature motive fluid, a pair of flanged casing sections, a plurality of contacting members engaging said casing section flanges, bolt means for effecting a firm engagement between said members and said flanges, and means for effecting a material difference comprising a drop of the temperature of said bolt means from that of the temperature of the walls of said sections.

5. In a heat engine employing a relatively high temperature motive fluid and having a plurality of decreasing pressure casing portions, one of said portions comprising abutting flanged casing sections, a plurality of contacting members engaging said casing section flanges, means for effecting a firm engagement between said members and said flanges, and means for conducting a portion of the motive fluid along said former means and back into said engine at a portion thereof of lower pressure, for the purpose of maintaining the temperature of said former means below the temperature of said flanged casing sections.

6. In a heat engine employing a relatively high temperature motive fluid and having a plurality of decreasing pressure casing portions, one of said portions comprising abutting flanged casing sections, a plurality of contacting members engaging said casing section flanges, hollow bolt means for effecting a firm engagement between said members and said flanges, and means for conducting a portion of the motive fluid through said bolt means and back into said engine at a portion thereof of lower pressure, for the purpose of maintaining the temperature of said hollow bolt means below the temperature of said flanged casing sections.

7. In a heat engine employing a relatively high temperature motive fluid and having a plurality of decreasing pressure casing portions, one of said portions comprising abutting flanged sections, a plurality of contacting members engaging said casing section flanges, means for effecting a firm engagement between said members and said flanges, means for conducting a regulatable portion of the motive fluid through said former means and back into said engine at a portion thereof of lower pressure, for the purpose of maintaining the temperature of said former means below the temperature of said flanged casing sections, and means for regulating said fluid flow.

8. In a heat engine employing a relatively high temperature motive fluid and having a plurality of decreasing pressure casing portions, one of said portions adjacent the fluid inlet end comprising abutting flanged casing sections, a plurality of contacting members engaging said casing section flanges, means for effecting a firm engagement between said members and said flanges, and means for conducting a portion of said motive fluid along said former means, said fluid portion being taken from a point in said engine of lower fluid temperature than the temperature in said casing sections and being returned after having negotiated said former means, into said engine at a point of lower pressure than the pressure at the point of the fluid portion's withdrawal from said engine.

9. In a heat engine employing a relatively high temperature motive fluid and having a plurality of decreasing pressure casing portions, one of said portions adjacent the fluid inlet end comprising abutting flanged casing sections, a plurality of contacting members engaging said casing section flanges, hollow bolt means for effecting a firm engagement between said members and said flanges, and means for conducting a portion of the motive fluid through said hollow bolt means, said fluid portion being taken from a point in said engine of lower fluid temperature than the temperature in said casing sections and being returned after having negotiated said hollow bolt means, into said engine at a point of lower pressure than the pressure at the point of the fluid portion's withdrawal from said engine.

10. In a heat engine, a casing portion for confining a hot working fluid, said casing portion comprising abutting flanged casing sections, a plurality of tensioned members for subjecting said flanges to mutual compression, and means for effecting and maintaining a difference comprising a substantial artificial drop of the temperature of said tensioned members from that of the temperature of the casing sections due to the heat of said working fluid, while the engine is in operation.

11. In a heat engine, a casing portion for confining a hot working fluid, said casing portion comprising abutting flanged casing sections, a plurality of hollow tensioned members for subjecting said flanges to mutual compression, and means for directing a cooling fluid into said tensioned members, to effect a lower temperature of said tensioned members than the temperature of said casing sections due to the heat of said working fluid, while the engine is in operation.

12. In a heat engine, a casing portion for confining a hot working fluid, said casing portion comprising abutting flanged casing sections, a plurality of tensioned members for subjecting said flanges to mutual compression, adjustable means cooperating with said flanges to change the tension in said members, and means for subjecting the members to heat exchange action with a fluid, to cool and maintain the tensioned members at temperatures lower than the temperature of said casing sections due to the heat of said working fluid, while the engine is in operation.

13. In a heat engine, a casing portion for confining a hot working fluid, said casing portion comprising abutting flanged casing sections, a plurality of tensioned members for subjecting said flanges to mutual compression, adjustable means cooperating with said flanges to change the tension in said members, and means for subjecting said members to heat exchange action with a portion of said working fluid, to cool and maintain the tensioned members at temperatures lower than the temperature of said casing sections due to the heat of said working fluid, while the engine is in operation.

14. In a heat engine employing a relatively high temperature motive fluid and having a plurality of decreasing pressure casing portions, one of said portions adjacent the fluid inlet end comprising abutting flanged sections, a plurality of tensioned members for subjecting said flanges to mutual compression, adjustable means cooperating with said flanges to change the tension in said members, and means for subjecting said members to heat exchange action with a portion of the motive fluid, said fluid portion being taken from a point in said engine of lower temperature than the temperature in said casing sections.

15. In an apparatus, a casing portion exposed to the high temperature and high pressure of the medium located therein, said casing portion comprising abutting casing sections having pairs of complementary flanges, a plurality of tensioned members for subjecting each pair of said flanges to mutual compression, and means for effecting cooling of and for maintaining an artificial reduction in the temperature of said members under that which these members would otherwise have because of their contacting relation with said heated flanges, said reduction in the temperature of said members being for the underlying purpose of augmenting or increasing the relative tensile strength of said members over that which they would have at the temperature of said flanges whose temperature they tend to closely approach because of the contacting relation between said members and said flanges, if the members were not cooled to a lower temperature.

16. The combination with a means for containing or conveying a substance of high temperature and comprising a flanged joint having a hollow bolt for fastening the flanges together, of means for supplying heating fluid through the bolt while the temperature of the flanges is increasing and supplying cooling fluid through the bolt when the flanges have reached a certain temperature whereby creeping of the bolt is substantially reduced.

17. Apparatus for confining a hot working fluid, comprising cooperating casing sections, hollow bolts disposed to clamp said casing sections together, and means for conveying working fluid into said hollow bolts for modifying the temperature of said bolts to enhance their clamping efficiency.

HANS P. DAHLSTRAND.